United States Patent
Hsiao

(10) Patent No.: US 9,024,968 B2
(45) Date of Patent: May 5, 2015

(54) USER INTERFACE RENDERING AND OPERATING METHOD, A COMPUTER PROGRAM PRODUCT, AND A UI RENDERING AND OPERATING SYSTEM

(75) Inventor: Yu-Hsia Hsiao, New Taipei (TW)

(73) Assignee: Wistron Corporation, New Taipei (TW)

( * ) Notice: Subject to any disclaimer, the term of this patent is extended or adjusted under 35 U.S.C. 154(b) by 490 days.

(21) Appl. No.: 13/451,331

(22) Filed: Apr. 19, 2012

(65) Prior Publication Data
US 2012/0268482 A1 Oct. 25, 2012

(30) Foreign Application Priority Data
Apr. 22, 2011 (TW) .............................. 100114059 A

(51) Int. Cl.
*G06F 9/44* (2006.01)
*G06F 17/22* (2006.01)
(52) U.S. Cl.
CPC .......... *G06F 9/4443* (2013.01); *G06F 17/2247* (2013.01)
(58) Field of Classification Search
None
See application file for complete search history.

(56) References Cited

U.S. PATENT DOCUMENTS

| 2009/0190574 A1* | 7/2009 | Houle et al. .................. 370/352 |
| 2009/0217310 A1* | 8/2009 | Koretz .......................... 719/328 |
| 2010/0154035 A1* | 6/2010 | Damola et al. .................... 726/4 |

OTHER PUBLICATIONS

Farhanfaiz, "Creating and deploying features in MOSS", URL: http://farhanfaiz.wordpress.com/2008/01/24/creating-and-deploying-feature-in-moss/.*

* cited by examiner

*Primary Examiner* — David H Chu
(74) *Attorney, Agent, or Firm* — Dickstein Shapiro LLP

(57) ABSTRACT

A user interface (UI) rendering and operating method is implemented by a processor with a deployment file, and comprises configuring the processor to implement a parent procedure for: parsing the deployment file so as to obtain UI rendering data that defines a visual design of the UI, feature provider data that defines a procedure providing a feature linked to a generated element of the UI, feature identification data that defines an identification corresponding to the feature, and element rendering data that defines a visual design of the element; binding the feature provider data and the feature identification data to the element; rendering the UI and the element with reference to the UI rendering data and the element rendering data.

10 Claims, 8 Drawing Sheets

USER INTERFACE RENDERING AND OPERATING METHOD, A COMPUTER PROGRAM PRODUCT, AND A UI RENDERING AND OPERATING SYSTEM

CROSS-REFERENCE TO RELATED APPLICATION

This application claims priority of Taiwanese Patent Application No. 100114059, filed on Apr. 22, 2011, and the disclosure of which is incorporated herein by reference.

BACKGROUND OF THE INVENTION

1. Field of the Invention

The present invention relates to techniques associated with a user interface (UI) of a software product, more particularly to a user interface (UI) rendering and operating method, a computer program product, and a UI rendering and operating system.

2. Description of the Related Art

In recent years, under a severe competition between various merchants and businesses, software companies are compelled constantly to compress development schedules of software as a demand for advancing the introduction of new products by clients rises. Nevertheless, for software products with similar properties, a majority of the functions are similar, and the software products diverge usually only in user interfaces (UIs) thereof. Moreover, when promoting sales of an identical software product to different customers, oftentimes the only customized and differentiated portion is the UI of the software product.

During the process of software development, drastic programming revisions are often required when a variation in the UI is desired. Even if functions of the software are modulized into reusable modules, once change in the UI is required, the software developer still needs to rewrite programs associated with the UI, and to connect or bind each function of the module to a respective UI component of the UI. In worse cases, even the mere change in the UI may result in the need to redevelop the entire software. Both reconstructing the UI with a moduli zed program design and redeveloping the entire software waste human and time resources.

SUMMARY OF THE INVENTION

Therefore, in a first aspect of the present invention, a user interface (UI) rendering and operating method is provided.

The UI rendering and operating method is to be implemented by a processor with a deployment file. The deployment file includes data associated with a parent procedure. The UI rendering and operating method comprises the steps which correspond to the parent procedure of:

(A) parsing the deployment file so as to obtain UI rendering data that defines a visual design of the UI;

(B) parsing the deployment file so as to obtain feature provider data that defines a procedure providing a feature which is linked to an element of the UI, feature identification data that defines an identification (ID) corresponding to the feature, and element rendering data that defines a visual design of the element;

(C) generating the element;

(D) binding the feature provider data and the feature identification data to the element;

(E) rendering the UI with reference to the UI rendering data; and (F) rendering the element in the UI with reference to the element rendering data.

In a second aspect of the present invention, a computer program product comprising a machine readable storage medium that has program instructions and a deployment file stored therein is provided. The deployment file includes UI rendering data that defines a visual design of the UI, feature provider data that defines a procedure providing a feature which is linked to an element of the UI, feature identification data that defines an identification (ID) corresponding to the feature, and element rendering data that defines a visual design of the element. The program instructions, when executed, cause a processor to implement a parent procedure for performing the aforementioned UI rendering and operating method.

In a third aspect of the present invention, a user interface (UI) rendering and operating system is provided. The UI rendering and operating system comprises a processor and a memory unit. The memory unit stores a deployment file and a plurality of program instructions. The program instructions are executable by the processor to implement a parent procedure that includes a parser unit and a rendering unit.

The parser unit is configured to:

parse the deployment file so as to obtain UI rendering data that defines a visual design of the UI;

parse the deployment file so as to obtain feature provider data that defines a procedure providing a feature which is linked to an element of the UI, feature identification data that defines an identification (ID) corresponding to the feature, and element rendering data that defines a visual design of the element;

generate the element; and bind the feature provider data and the feature identification data to the element.

The rendering unit is configured to:

render the UI with reference to the UI rendering data; and render the element in the UI with reference to the element rendering data.

An effect of the present invention resides in that since the deployment file may be used to define visual designs of the UI and the element thereof, and define deployment of the element and the feature which is linked thereto, a software developer may simply edit the deployment file to satisfy the need to provide different kinds of UIs in the process of developing corresponding software products.

BRIEF DESCRIPTION OF THE DRAWINGS

Other features and advantages of the present invention will become apparent in the following detailed description of the embodiment with reference to the accompanying drawings, of which.

DETAILED DESCRIPTION OF THE EMBODIMENT

Figure 1:
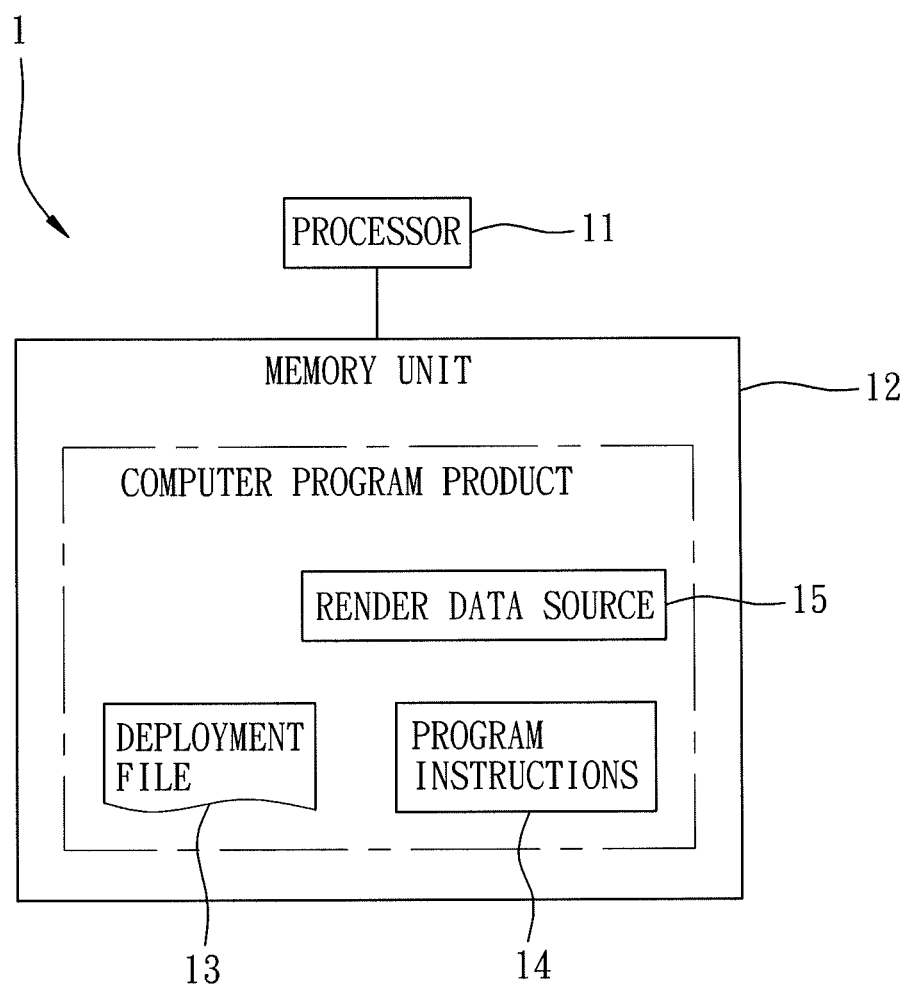
FIG. 1 is a block diagram illustrating an embodiment of a user interface (UI) rendering and operating system according to the present invention.
Figure 2:
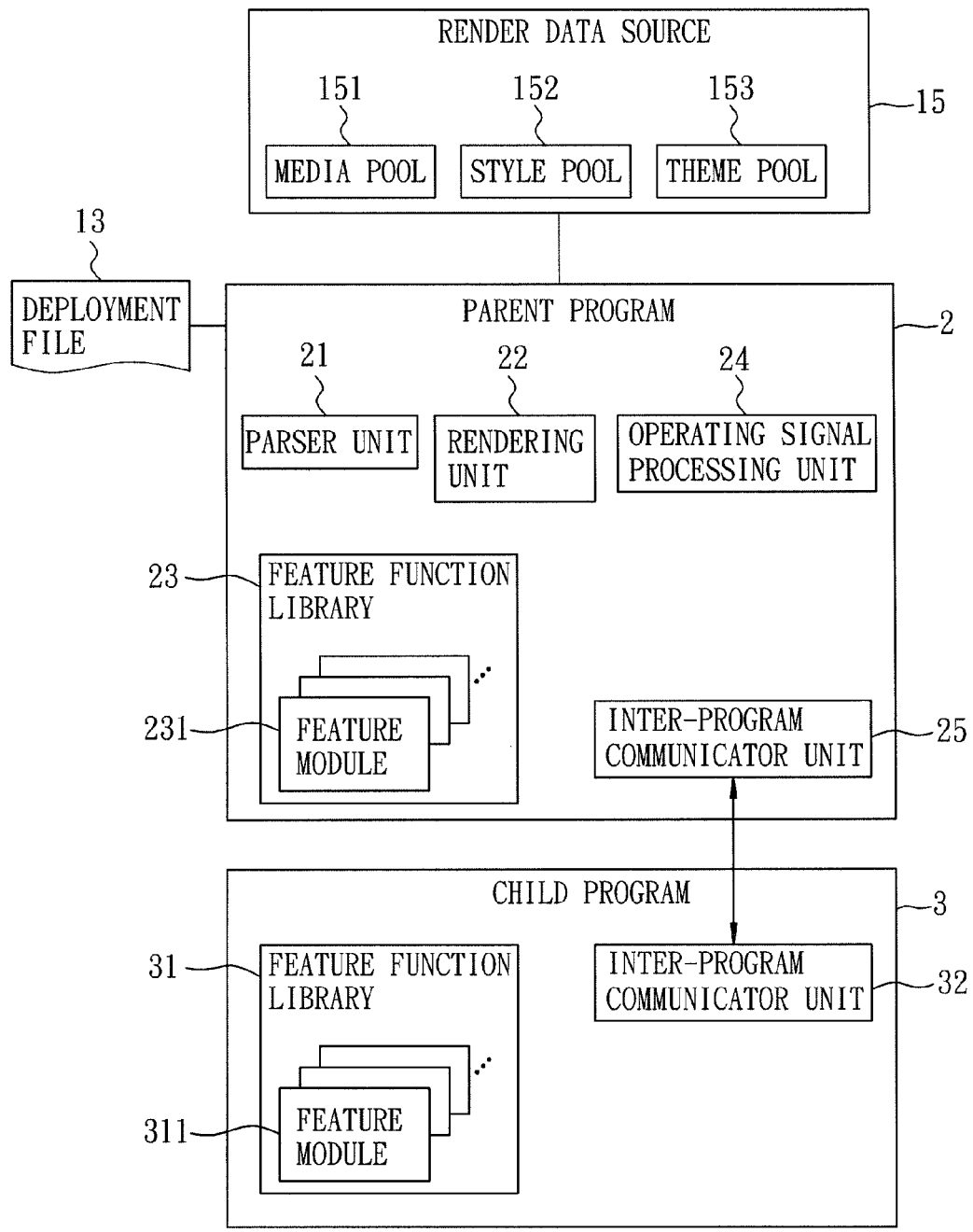
FIG. 2 is a block diagram illustrating a render data source, a parent procedure, a deployment file associated with the parent procedure, and a child procedure associated with the parent procedure in the embodiment.

Referring to FIG. 1 and FIG. 2, an embodiment of a user interface (UI) rendering and operating system according to the present invention comprises a processor 11 and a memory unit 12. The memory unit 12 stores at least one deployment file 13, a plurality of program instructions 14, and a render data source 15. It is noted that the processor 11 and the memory unit 12 are hardware components of an electronic device such as a computer. The UI in the present invention is generated by software, and the UI includes at least one element to be operated by a user.

In this embodiment, the deployment file 13, the program instructions 14, and the render data source 15 are developed based on Android operating system, and are integrated into a computer program product, such as a software package, for provision to customers. However, development of the deployment file 13, the program instructions 14, and the render data source 15 may be based on different kinds of operating systems, and is not limited to the disclosure herein.

The deployment file 13 stored in the memory unit 12 may be edited by a software developer so as to define visual designs of the UI and the element of the UI, and to define deployment of the element of the UI and of a feature which is linked to the element. Moreover, the software developer may further define a software procedure framework having a parent-child relation by editing the deployment file 13. The deployment file 13 includes data associated with a parent procedure 2. In this embodiment, the deployment file 13 is an Extensible Markup Language (XML) file. Content of the deployment file 13 are briefly illustrated hereinafter:

TABLE 1

```
<?xml version="1.0" encoding="UTF-8"?>
<capsule xmlns="reserved" version="1.0">
  <header>
    ...
    <theme>UI rendering data</theme>
  </header>
  <body>
    <feature provider="feature provider data"
    id="feature identification data" ... style="style
    data" mediaSrc="multimedia file">
      ...
      <params>
        <param type="type definition data" key="key
        data" value="value data"/>
        ...
      </params>
    </feature>
    ...
  </body>
</capsule>
```

In the deployment file 13 illustrated in Table 1, the content between theme tags defines the visual design of the UI. The content corresponding to feature tags defines the element of the UI including the deployment of the feature linked to the element, and the visual design of the element, where feature provider defines a procedure providing the feature which is linked to the element of the UI, id defines a feature module providing the feature which is linked to the element of the UI, and the content between params tags defines a feature parameter set to be sent to the feature module for executing the feature which is linked to the element of the UI. The feature parameter set includes key data and value data. Herein, the feature provider data may indicate the parent procedure 2 or a child procedure 3 associated with the parent procedure 2 to be the feature provider, and the feature identification data may indicate feature module 231 of the parent procedure 2 or feature module 311 of the child procedure 3 to be the feature module providing the feature which is linked to the element of the UI. Although, the deployment file 13 illustrated in Table 1 is described in XML format, the deployment file 13 may also be in other formats, and is not limited to the disclosure herein.

The program instructions 14 stored in the memory unit 12 may be performed by the processor 11 for implementing at least one parent procedure and at least one child procedure associated with the parent procedure. The parent procedure and the child procedure are configured to construct the aforementioned software procedure framework having the parent-child relation. The software procedure framework may be illustrated as a procedure tree. In the procedure tree, for nodes other than leaf nodes, each node and a node at a lower tier may correspond respectively to a parent procedure and a child procedure.

With reference to FIG. 2, the parent procedure 2 is configured to operate with the deployment file 13 associated therewith. The parent procedure 2 includes a parser unit 21, a rendering unit 22, a feature function library 23, an operating signal processing unit 24, and an inter-procedure communicator unit 25. The parser unit 21 is configured to parse the deployment file 13 and to deploy the element of the UI and the feature linked to the element according to the result obtained through parsing the deployment file 13. The rendering unit 22 is configured to render the UI associated with the parent procedure 2 and the element in the UI according to the result obtained by the parser unit 21. The feature function library 23 includes at least one feature module 231. The feature module 231 may provide a feature associated with the parent procedure 2. The operating signal processing unit 24 is configured to process an operating signal resulting from operating the element of the UI. The inter-procedure communicator unit 25 is configured to communicate with the child procedure 3.

The child procedure 3 includes a feature function library 31 and an inter-procedure communicator unit 32. The feature function library 31 includes at least one feature module 311. The feature, module 311 may provide a feature associated with the child procedure 3. The inter-procedure communicator unit 32 is configured to communicate with the parent procedure 2.

The render data source 15 stored in the memory unit 12 shown in FIG. 1 includes a media pool 151, a style pool 152, and a theme pool 153. The media pool 151 includes different kinds of media files. The style pool 152 includes different kinds of pre-stored styles for the visual-design of the element of the UI. The theme pool 153 includes different kinds of pre-stored themes for the visual-design of the UI. Contents in the media pool 151, the style pool 152 and the theme pool 153 are provided for use by the rendering unit 22 of the parent procedure 2. The implementation method thereof may be readily appreciated by those skilled in the art, such that further details of the same are omitted herein for the sake of brevity.

Figure 3:
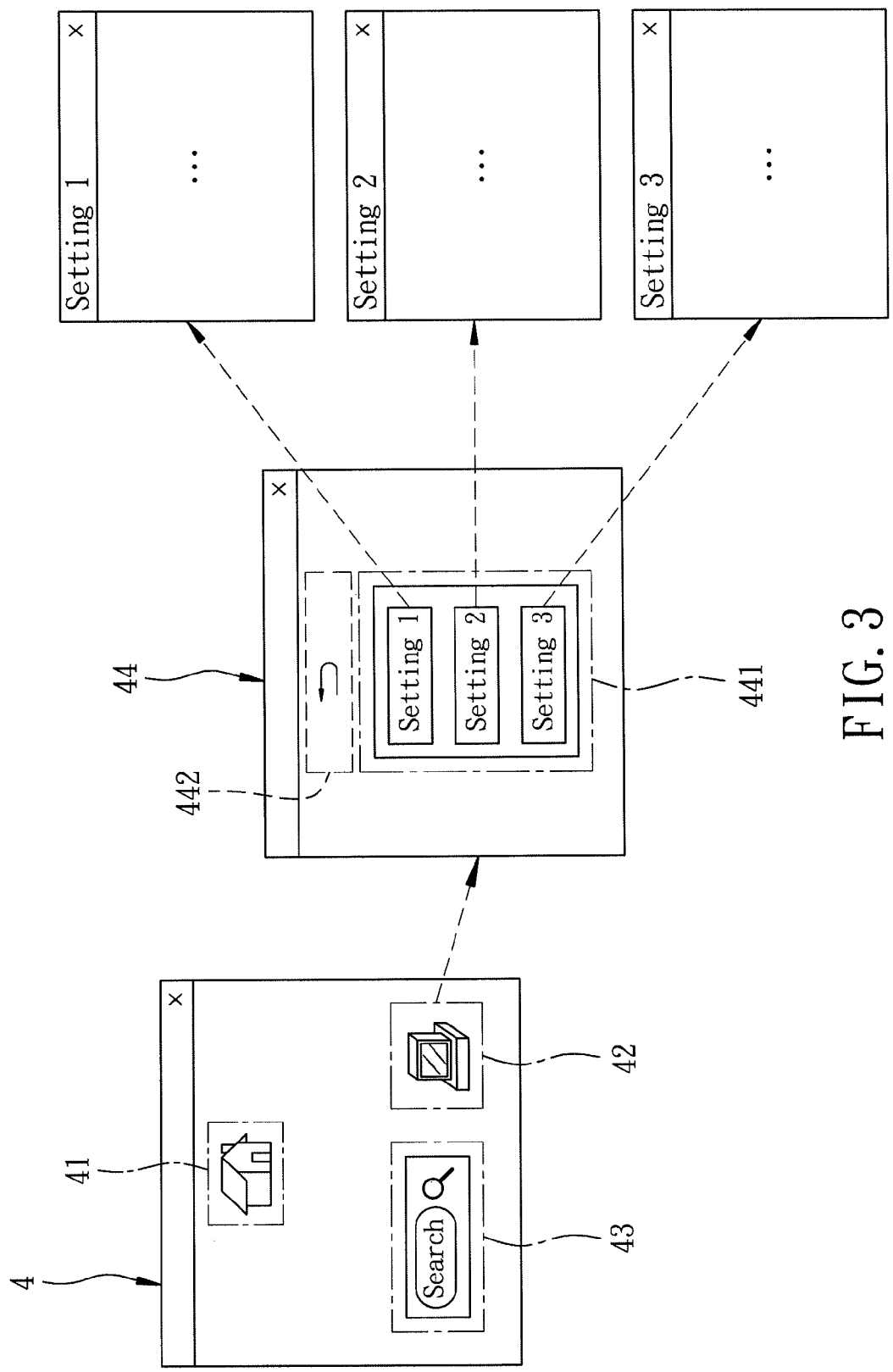
FIG. 3 is a schematic view illustrating an example of a UI and elements of the UI according to the embodiment of the present invention.
Figure 4:
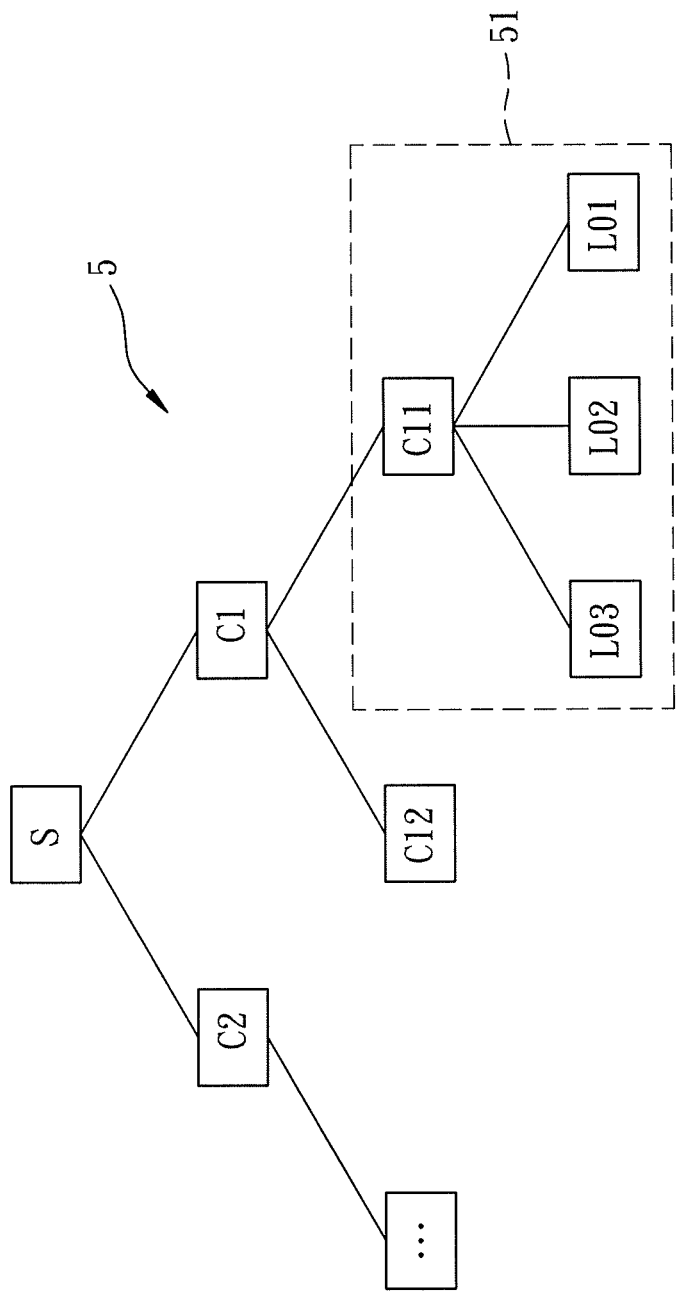
FIG. 4 is a schematic diagram illustrating an S procedure tree corresponding to a software procedure framework according to the embodiment of the present invention.

Referring to FIGS. 2 to 4 in cooperation with an exemplary deployment file which conforms with the format of the deployment file 13 mentioned above, a UI 4 and elements 41, 42 and 43 of the UI 4 defined by the exemplary deployment file are illustrated hereinafter. Content of the exemplary deployment file is described in Table 2.

TABLE 2

```
<?xml version="1.0" encoding="UTF-8"?>
<capsule xmlns="reserved" version="1.0">
    <header>
      ...
      <theme>themeMain</theme>
      ...
    </header>
    <body>
       <feature provider="S.app" id="home" ... style="
       iconButton0" mediaSrc="home.png">
          ...
          <params>
          <param type="type0" key="key0" value="value0"/>
          ...
          </params>
          ...
       </feature>
       <feature provider="S.C1" id="search" ... style="
       freeBlock">
          ...
          <params>
          <param type="type1" key="key1" value="value1"/>
          ...
          </params>
          ...
       </feature>
       <feature provider="S.C2" id="setting" ... style="
       iconButton2" mediaSrc="setting.png">
          ...
          <params>
          <param type="type2" key="key2" value="value2"/>
          ...
          </params>
          ...
       </feature>
       ...
    </body>
</capsule>
```

In the exemplary deployment file shown in Table 2, there are three paragraphs of content between pairs of the feature tags (i.e., bold-faced text in Table 2). Each of the paragraphs defines the feature and the visual design of a respective one of the elements 41, 42 and 43 of the UI 4. The element 41 of the UI 4 corresponds to a root node (S) of an S procedure tree 5 (see FIG. 4), and the elements 42 and 43 respectively correspond to sub-nodes (C1) and (C2) located at the lower tier relative to the root node (S). A first of the three paragraphs is used as an example for further illustration. Feature provider="S.app" defines that the procedure providing the feature which is linked to the element 41 of the UI 4 is "S.app". Id="home" defines that the feature module providing the feature which is linked to the element 41 of the UI 4 is the feature modules of the feature provider (S.app in this case) with an id of "home". Style="iconButton0" and mediaSrc="home.png" define information associated with the visual design of the element 41 of the UI 4. Definitions and explanations associated with the elements 42 and 43 of the UI 4 are similar to those of the element 41, such that details of the same are omitted herein for the sake of brevity.

Similarly, the software developer may further define, by means of editing another deployment file 13 which is associated with the sub-node (C1), a UI 44 at a lower tier to be rendered as a result of operating the element 42 of the UI 4. The UI 44 includes elements 441 and 442 (each corresponding respectively to sub-nodes (C11) and (C12)). In this way, the software developer may fully define the software procedure framework represented as the S procedure tree 5 by means of editing a plurality of deployment files 13.

Figure 5:
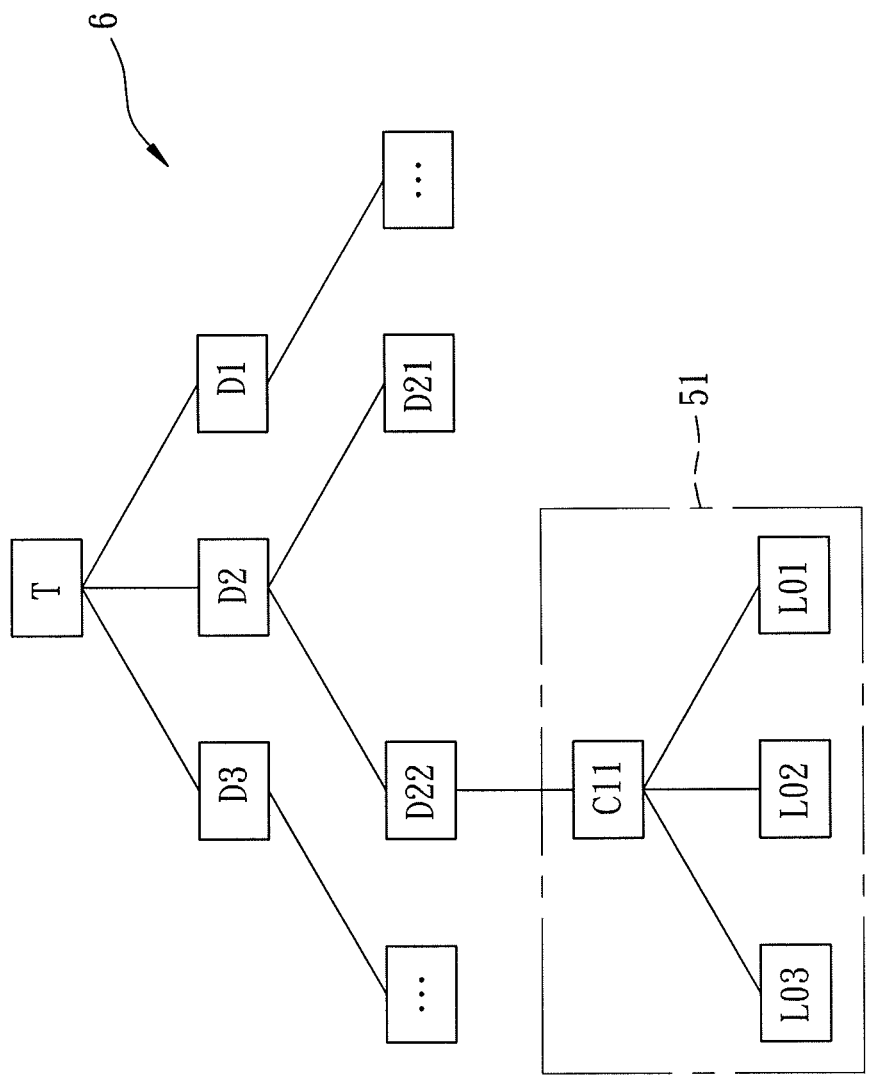
FIG. 5 is a schematic diagram illustrating a T procedure tree corresponding to another software procedure framework according to the embodiment of the present invention.
Figure 6A:
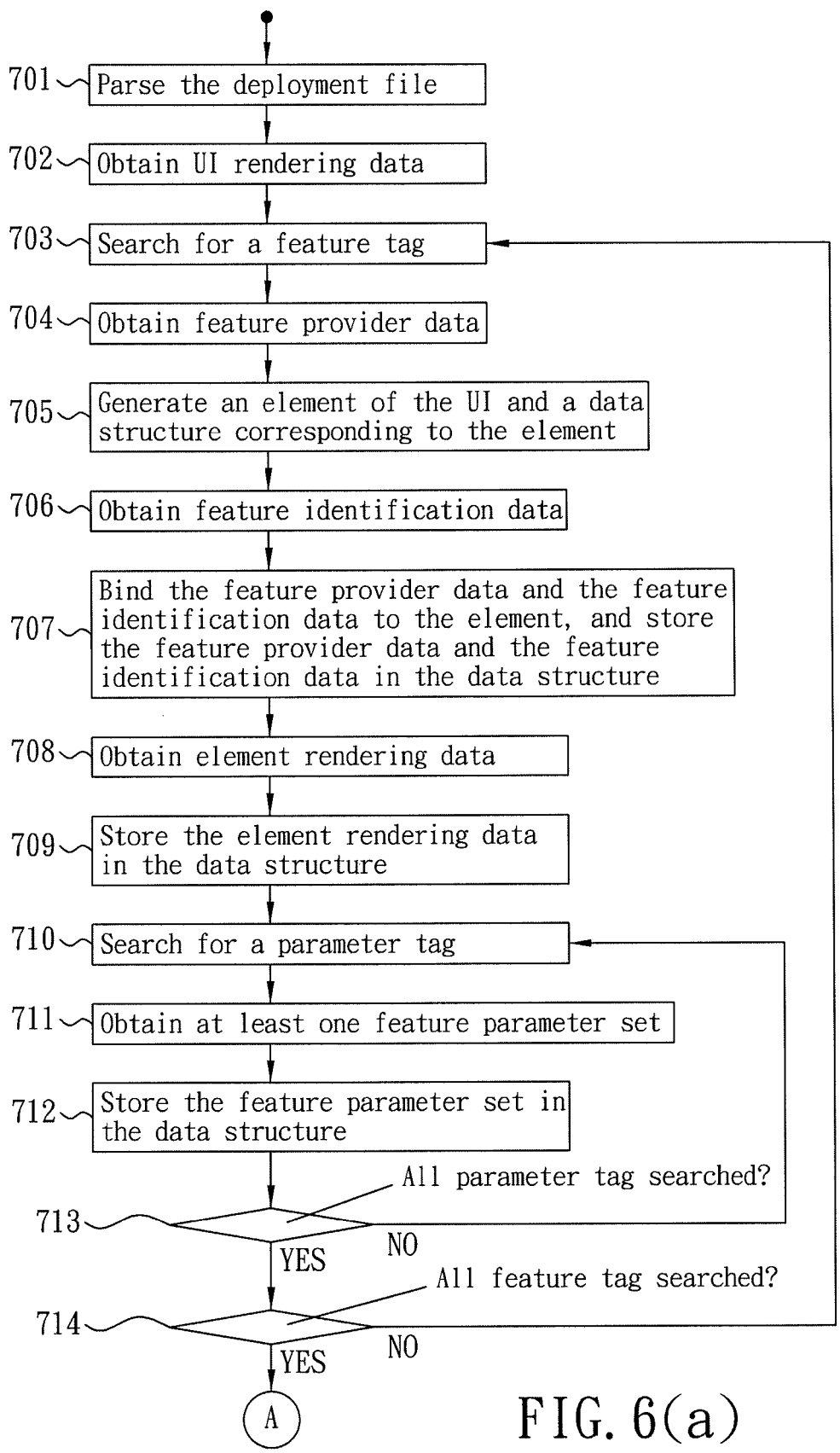
FIGS. 6(a) and 6(b) are flow charts illustrating steps performed by the parent procedure in a user interface (UI) rendering and operating method according to the present invention.
Figure 6B:
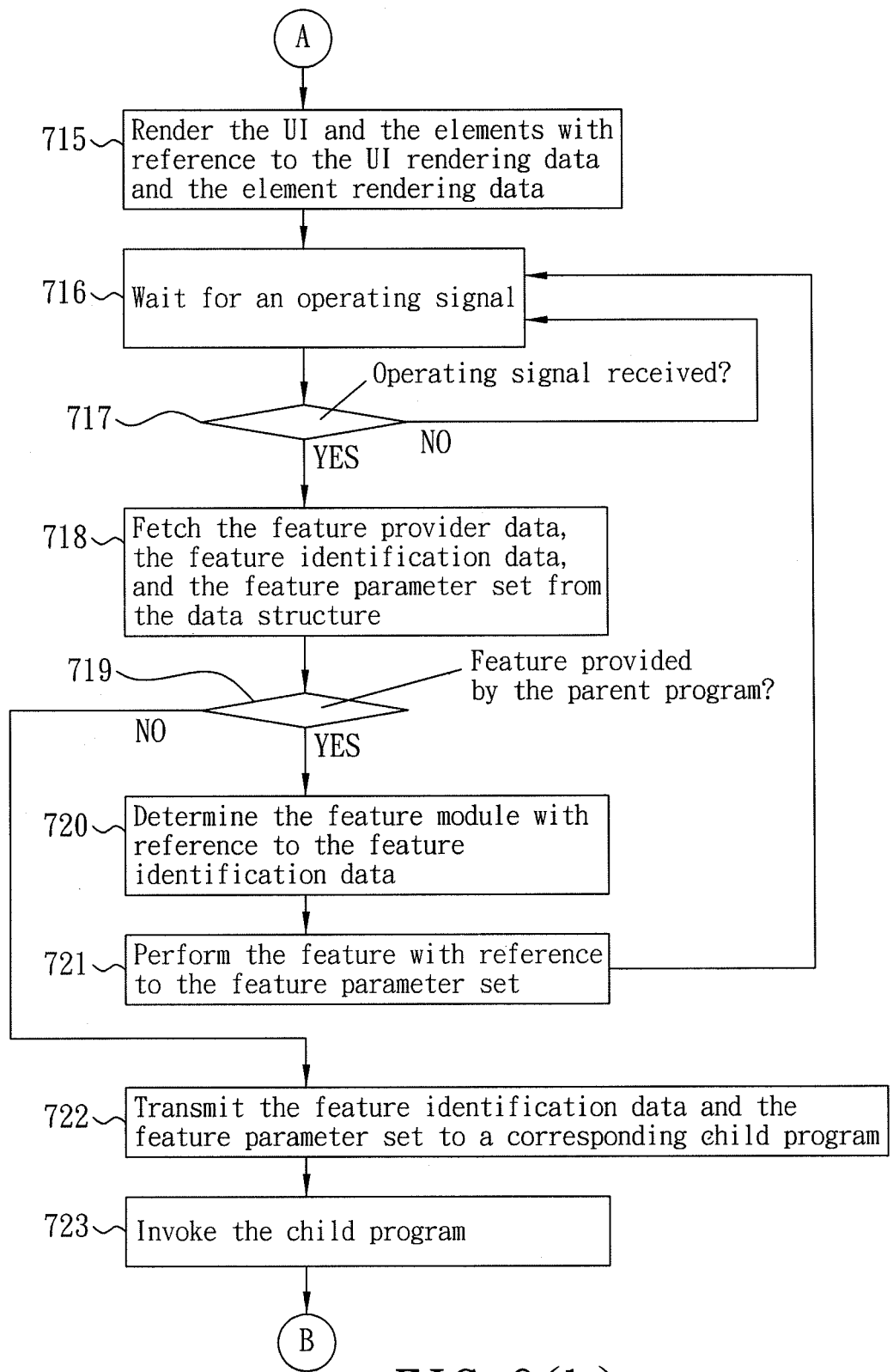

Referring to FIGS. 1, 4 and 5, when the software developer intends to develop another software procedure framework (represented as a T procedure tree 6), and if a part of feature deployment is identical to the feature deployment developed previously, for example, if the elements of the UI and the deployment of the features linked thereto that correspond to a subtree 51 of the S procedure tree 5 are to be re-used, the software developer is only required to edit the deployment file 13 that corresponds to a sub-node (D22) of the T procedure tree 6 so as to transplant the whole subtree 51 below the sub-node (D22). The software developer may be freed from writing relevant programs and connecting/binding the features to the elements of the UI corresponding to the subtree 51 once again, such that the time required for software development is effectively reduced.

Referring to FIGS. 2, 6(a), 6(b) and 7 in cooperation with a UI rendering and operating method, operation between the aforementioned parent procedure 2 and the child procedure 3 is illustrated in further detail. Steps 701~723 are performed by the parent procedure 2, and steps 801~806 are performed by the child procedure 3.

The parser unit 21 of the parent procedure 2 is configured to perform steps 701~714. The rendering unit 22 is configured to perform step 715. The operating signal processing unit 24 is configured to perform steps 716~720. The feature module 231 of the feature function library 23 is configured to perform step 721. The inter-procedure communicator unit 25 is configured to perform steps 722~723.

In step 701, the parser unit 21 is configured to parse the deployment file 13 associated with the parent procedure 2.

In step 702, the parser unit 21 is configured to obtain UI rendering data that defines a visual design of the UI. Referring to the exemplary deployment file in Table 2, "themeMain" is obtained as the UI rendering data through parsing content defined by the theme tags.

In step 703, the parser unit 21 is configured to search the deployment file 13 for a predefined feature tag (<feature).

In step 704, the parser unit 21 is configured to parse the content corresponding to the searched feature tag in the deployment file 13, so as to obtain feature provider data that defines a procedure providing a corresponding feature which is linked to a corresponding element of the UI. For example, referring to the exemplary deployment file in Table 2, "S.app" is obtained as the feature provider data through parsing the content corresponding to the first feature tag.

In step 705, the parser unit 21 is configured to generate the corresponding element of the UI and a data structure corresponding to the element. Since there may be multiple feature tags each corresponding to one element to be operated by the user, the parser unit 21 is configured to generate correspondingly a data structure to correspond to each element for storing data associated with rendering of the element and the feature linked to the element.

In step 706, the parser unit 21 is configured to parse the content corresponding to the searched feature tag in the deployment file 13 so as to further obtain feature identification data that defines an identification (ID) corresponding to the corresponding feature. Referring to the exemplary deployment file in Table 2, "home" is obtained as the feature identification data through parsing the content corresponding to the first feature tag.

In step 707, the parser unit 21 is configured to bind the feature provider data and the feature identification data to the corresponding element of the UI, and to store the feature provider data and the feature identification data in the data structure that corresponds to the corresponding element. The aforementioned binding refers to establishing a connection between each element of the UI and data associated with the feature that is linked to the element and that is to be performed when the element is operated.

In step 708, the parser unit 21 is configured to parse the content corresponding to the searched feature tag in the deployment file 13 so as to further obtain element rendering data that defines a visual design of the corresponding element. Referring to the exemplary deployment file in Table 2, "iconButton0" and "home.png" are obtained as the element rendering data through parsing the content corresponding to the first feature tag.

In step 709, the parser unit 21 is configured to store the element rendering data in the data structure that corresponds to the corresponding element.

In step 710, the parser unit 21 is configured to search, within the content corresponding to the searched feature tag, for a parameter tag (<params>).

In step 711, the parser unit 21 is configured to parse content corresponding to the searched parameter tag in the deployment file 13 so as to obtain at least one feature parameter set corresponding to the feature identification data. The feature parameter set defines parameters used for executing the corresponding feature. Referring to the exemplary deployment file in Table 2, "key0" and "value0" are obtained as the feature parameter set that corresponds to the feature identification data ("home") through parsing the content corresponding to the first feature tag, and a' type of the parameter set is "type0". The common types of the feature parameter set include string, integer, floating, etc.

In step 712, the parser unit 21 is configured to store the feature parameter set in the data structure that corresponds to the corresponding element.

In step 713, the parser unit 21 continues to search the content corresponding to the searched feature tag so as to determine whether contents corresponding to all of the parameter tags therein have been parsed. When it is determined that the content corresponding to all of the parameter tags within the content corresponding to the searched feature tag have been parsed, the flow proceeds to step 714. In the negative, the flow goes back to step 710.

In step 714, the parser unit 21 continues to search the deployment file 13 so as to determine whether contents corresponding to all feature tags have been parsed. When it is determined that the content corresponding to all feature tags have been parsed in the deployment file 13, the flow proceeds to step 715. In the negative, the flow goes back to step 703.

In step 715, the rendering unit 22 is configured to render the UI with reference to the UI rendering data, and to render each element in the UI with reference to the element rendering data that is obtained through parsing the content corresponding to the corresponding feature tag.

Referring to FIGS. 2, 3, 6(a) and 6(b) in cooperation with the exemplary deployment file in Table 2, the rendering unit 22 is configured to determine a theme to be applied to the visual design of the UI 4 from the theme pool 153 of the render data source 15 with reference to the UI rendering data "themeMain", and to render each of the elements 41, 42 and 43 in the UI 4 with reference to the corresponding element rendering data. For example, the element 41 of the UI 4 is rendered as an operable button with a button style determined by the rendering unit 22 by looking into the style pool 152 of the render data source 15 with reference to the element rendering data "iconButton0", and a button image determined by the rendering unit 22 by looking into the media pool 151 of the render data source 15 with reference to the element rendering data "home.png"

In step 716, the operating signal processing unit is configured to wait for an operating signal resulting from operating one of the elements of the UI by a user.

In step 717, the operating signal processing unit 24 is configured to determine whether the operating signal is received. Upon determining that the operating signal is received, the flow proceeds to step 718. In the negative, the flow goes back to step 716.

In step 718, the operating signal processing unit 24 is configured to fetch the feature provider data, the feature identification data, and the feature parameter set from the data structure that corresponds to the operated element.

In step 719, the operating signal processing unit 24 is configured to make a determination with reference to the feature provider data, which is fetched from the data structure that corresponds to the operated element, as to whether the feature that is linked to the operated element of the UI is provided by the parent procedure itself. When a result of the determination is affirmative, the flow proceeds to step 720. When the result of the determination is negative, the flow proceeds to step 722.

In step 720, the operating signal processing unit 24 is configured to locate, from within the feature function library 23 of the parent procedure 2, the feature module 231 providing the feature which is linked to the operated element of the UI with reference to the feature identification data fetched from the data structure that corresponds to the operated element.

In step 721, the feature module 231 is configured to perform the feature linked to the operated element of the UI with reference to the feature parameter set fetched from the data structure that corresponds to the operated element. The flow goes back to step 716 after the feature is performed.

In step 722, the inter-procedure communicator unit 25 is configured to transmit the feature identification data and the feature parameter set, which are fetched from the data structure that corresponds to the operated element, to the child procedure 3 that corresponds to the feature provider data. In this embodiment, the inter-procedure communicator unit 25 is configured to transmit an event message (such as the intent message used in Android operating system) that includes the feature identification data and the feature parameter set to the corresponding child procedure 3.

In step 723, the inter-procedure communicator unit 25 is configured to invoke the corresponding child procedure 3.

Referring to the UI 4 illustrated in FIG. 3, the operating signal processing unit 24 receives a corresponding operating signal when any one of the elements 41, 42 and 43 of the UI 4 is operated.

Assuming that the element 41 of the UI 4 is operated, and referring to step 718, the operating signal processing unit 24 is configured to fetch the feature provider data (S.app), the feature identification data (home), and the feature parameter set (key0, value0) from the data structure that corresponds to the element 41. Referring to step 719, the operating signal processing unit 24 is configured to determine that the feature linked to the element 41 is provided by the parent procedure 2 with reference to the feature provider data (S.app) fetched from the data structure that corresponds to the element 41. Referring to steps 720~721, the operating signal processing unit 24 is configured to determine the feature module 231 that provides the feature which is linked to the element 41 with reference to the feature identification data (home) fetched from the data structure that corresponds to the element 41, and the feature module 231 is configured to perform the corresponding feature which is linked to the element 41 with reference to the feature parameter set (key0, value0) fetched from the data structure that corresponds to the element 41.

Assuming that the element 42 of the UI 4 is operated, and referring to step 718, the operating signal processing unit 24 is configured to fetch the feature provider data (S.C1), the feature identification data (search), and the feature parameter set (key1, value1) from the data structure that corresponds to the element 42. Referring to step 719, the operating signal processing unit 24 is configured to determine that the feature linked to the element 42 is not provided by the parent procedure 2 with reference to the feature provider data (S.C1) fetched from the data structure that corresponds to the element 42. Referring to steps 722~723, the inter-procedure communicator unit 25 is configured to transmit the feature identification data (search) and the feature parameter set (key1, value1), which are fetched from the data structure that corresponds to the element 42, to the corresponding child procedure 3, and to invoke the corresponding child procedure 3.

Figure 7:
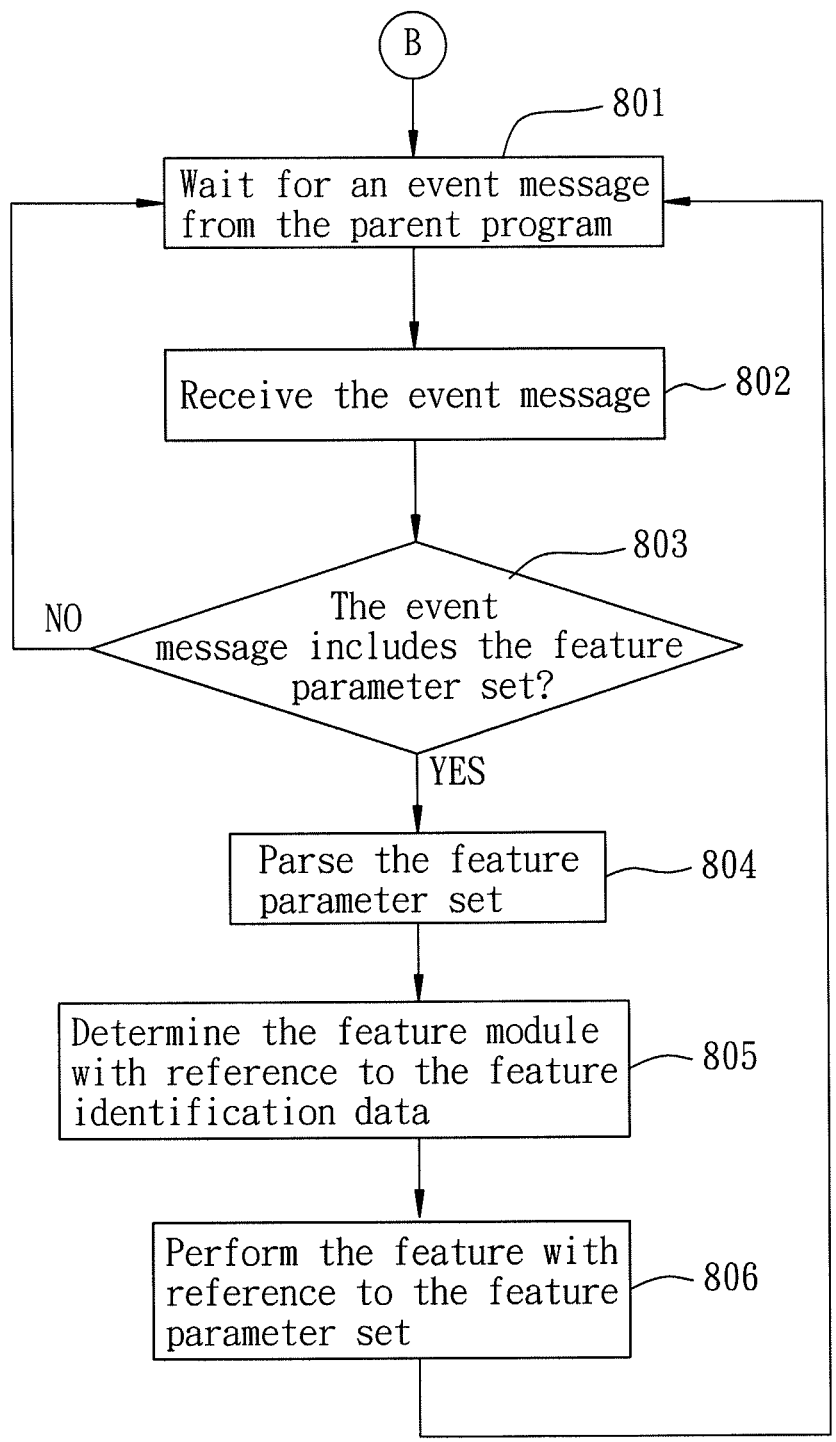
FIG. 7 is a flowchart illustrating steps performed by the child procedure in the method according to the present invention.

Referring to FIG. 2 and FIG. 7, the child procedure 3 is configured to perform steps 801 and 803~805. The inter-procedure communicator unit 32 is configured to perform step 802. The feature module 311 of the feature function library 31 is configured to perform step 806.

In step 801, the child procedure 3 is configured to wait for an event message from the parent procedure 2 associated therewith. The event message is generated as a result of the operating signal processing unit 24 of the parent procedure 2 determining that the procedure providing the feature which is linked to the operated element of the UI is not the parent procedure.

In step 802, the inter-procedure communicator unit 32 is configured to receive the event message transmitted by the parent procedure 2.

In step 803, the child procedure 3 is configured to parse the event message so as to obtain the feature identification data, and to determine whether the event message includes the feature parameter set. Upon determining that the event message includes the feature parameter set, the flow proceeds to step 804. In the negative, the flow goes back to step 801.

In step 804, the child procedure 3 is configured to parse the feature parameter set. In this embodiment, the key data and the value data are obtained by means of parsing the feature parameter set.

In step 805, the child procedure 3 is configured to locate, from within the feature function library 31, the feature module 331 providing the feature which is linked to the operated element of the UI, with reference to the feature identification data obtained through parsing the event message.

In step 806, the feature module 311 is configured to perform the feature linked to the operated element of the UI with reference to the feature parameter set, and the flow goes back to step 801 after the feature is performed.

In summary, since the deployment file 13 may be utilized to define the visual designs of the UI and each element of the UI, and to define the deployment of each element of the UI and of the feature which is linked to the element, during the process of developing and productizing software, the software developer, by means of editing the deployment file 13, may develop, without the need to revise the program at all, a series of the same software product with varying UIs.

While the present invention has been described in connection with what is considered the most practical embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A user interface (UI) rendering and operating method to be implemented by a processor with a deployment file, the deployment file including data associated with a parent procedure, the method comprising the steps which correspond to the parent procedure of:
  (A) parsing the deployment file so as to obtain UI rendering data that defines a visual design of the UI;
  (B) parsing the deployment file so as to obtain feature provider data that defines a procedure providing a feature which is linked to an element of the UI, feature identification data that defines an identification (ID) corresponding to the feature, element rendering data that defines a visual design of the element, and at least one feature parameter set that defines parameters used for executing the feature;
  (C) generating the element, and a data structure corresponding to the element;
  (D) binding the feature provider data and the feature identification data to the element, and storing the feature provider data, the feature identification data and the feature parameter set in the data structure that corresponds to the element;
  (E) rendering the UI with reference to the UI rendering data;
  (F) rendering the element in the UI with reference to the element rendering data;
  (H) fetching the feature provider data, the feature identification data, and the feature parameter set from the data structure that corresponds to the element upon receipt of an operating signal resulting from operating the element of the UI;
  (I) determining, with reference to the feature provider data fetched in step (H), whether the feature linked to the operated element of the UI is provided by the parent procedure itself; and
  (J) performing the feature with reference to the feature identification data and the feature parameter set fetched in step (H) when it is determined that the feature linked to the operated element of the UI is provided by the parent procedure in step (I).

2. The UI rendering and operating method as claimed in claim 1, wherein step (B) comprises:
  (B-1) searching the deployment file for a predefined feature tag; and
  (B-2) parsing content corresponding to the feature tag in the deployment file so as to obtain the feature provider data, the feature identification data, and the element rendering data.

3. The UI rendering and operating method as claimed in claim 2, further comprising, between step (D) and step (E), the step which corresponds to the parent procedure of:
  (G) repeating steps (B) to (D) upon determining that there is at least one feature tag in the deployment file that has not been searched.

4. The UI rendering and operating method as claimed in claim 1, wherein step (D) further comprises storing the element rendering data in the data structure that corresponds to the element.

5. The UI rendering and operating method as claimed in claim 1, further comprising, after step (I), the steps which correspond to the parent procedure of:
  (K) transmitting the feature identification data and the feature parameter set fetched in step (H) to the procedure providing the feature linked to the operated element of the UI, i.e., a child procedure when it is determined that the feature linked to the operated element of the UI is not provided by the parent procedure in step (I); and (L) invoking the child procedure.

6. The UI rendering and operating method as claimed in claim 5, further comprising the steps which correspond to the child procedure of:

(M) receiving the feature identification data and the feature parameter set as transmitted by the parent procedure; and (N) performing the feature linked to the operated element of the UI with reference to the feature identification data and the feature parameter set received by the child procedure in step (M).

7. A computer program product comprising a machine readable storage medium having program instructions and a deployment file stored therein, the deployment file including user interface (UI) rendering data that defines a visual design of a UI, feature provider data that defines a procedure providing a feature which is linked to an element of the UI, feature identification data that defines an identification (ID) corresponding to the feature, and element rendering data that defines a visual design of the element, said program instructions, when executed, causing a processor to implement a parent procedure for rendering and operating a user interface (UI) by:

(A) parsing the deployment file so as to obtain the UI rendering data;

(B) parsing the deployment file so as to obtain the feature provider data, the feature identification data, the element rendering data, and at least one feature parameter set that defines parameters used for executing the feature;

(C) generating the element, and a data structure corresponding to the element;

(D) binding the feature provider data and the feature identification data to the element, and storing the feature provider data, the feature identification data and the feature parameter set in the data structure that corresponds to the element;

(E) rendering the UI with reference to the UI rendering data;

(F) rendering the element in the UI with reference to the element rendering data;

(G) fetching the feature provider data, the feature identification data, and the feature parameter set from the data structure that corresponds to the element upon receipt of an operating signal resulting from operating the element of the UI;

(H) determining, with reference to the feature provider data fetched in step (G), whether the feature linked to the operated element of the UI is provided by the parent procedure itself; and (I) performing the feature with reference to the feature identification data and the feature parameter set fetched in step (G) when it is determined that the feature linked to the operated element of the UI is provided by the parent procedure in step (H).

8. A user interface (UI) rendering and operating system comprising:

a processor; and a memory unit storing a deployment file and a plurality of program instructions, the program instructions being executable by said processor to implement a parent procedure that includes a parser unit and a rendering unit;

wherein the parser unit is configured to:
parse the deployment file so as to obtain UI rendering data that defines a visual design of the UI;
parse the deployment file so as to obtain feature provider data that defines a procedure providing a feature which is linked to an element of the UI, feature identification data that defines an identification (ID) corresponding to the feature, element rendering data that defines a visual design of the element, and at least one feature parameter set that defines parameters used for executing the feature;
generate the element; and
bind the feature provider data and the feature identification data to the element; and wherein the rendering unit is configured to:
render the UI with reference to the UI rendering data; and
render the element in the UI with reference to the element rendering data;

wherein the parent procedure further includes an operating signal processing unit and a feature function library which includes at least one feature module, the feature identification data defining which feature module provides the feature linked to the element of the UI, wherein, upon receipt of an operating signal that results from operating the element of the UI, the operating signal processing unit is configured to determine, with reference to the feature provider data, whether the feature linked to the operated element of the UI is provided by the parent procedure, and wherein the feature module corresponding to the feature identification data is configured to perform the feature with reference to the feature parameter set when it is determined that the feature linked to the operated element of the UI is provided by the parent procedure.

9. The UI rendering and operating system as claimed in claim 8, wherein the parent procedure further includes an inter-procedure communicator unit, the program instructions being executable by said processor to implement a child procedure, said child procedure including a feature function library which includes at least one feature module;

wherein the inter-procedure communicator unit of the parent procedure is configured to:
transmit the feature identification data and the feature parameter set to the child procedure when it is determined with reference to the feature provider data that the feature linked to the operated element of the UI is provided by the child procedure; and
invoke the child procedure.

10. The UI rendering and operating system as claimed in claim 9, wherein the child procedure further includes an inter-procedure communicator unit;

wherein the inter-procedure communicator unit of the child procedure is configured to receive the feature identification data and the feature parameter set from the inter-procedure communicator unit of the parent procedure; and wherein the feature module of the child procedure corresponding to the feature identification data is configured to perform the feature linked to the operated element of the UI with reference to the feature parameter set.

* * * * *